United States Patent
Rengasamy et al.

(10) Patent No.: US 10,675,934 B2
(45) Date of Patent: Jun. 9, 2020

(54) AXLE ASSEMBLY AND METHOD OF MANUFACTURE

(71) Applicant: ArvinMeritor Technology, LLC, Troy, MI (US)

(72) Inventors: Srinivasa Perumal Rengasamy, Troy, MI (US); Ryong-Uk Kwon, Windsor (CA)

(73) Assignee: ArvinMeritor Technology, LLC, Troy, MI (US)

( * ) Notice: Subject to any disclaimer, the term of this patent is extended or adjusted under 35 U.S.C. 154(b) by 184 days.

(21) Appl. No.: 15/949,419

(22) Filed: Apr. 10, 2018

(65) Prior Publication Data

US 2019/0308476 A1   Oct. 10, 2019

(51) Int. Cl.
*B60G 9/02*  (2006.01)
*B60G 13/00*  (2006.01)

(52) U.S. Cl.
CPC ............ *B60G 9/02* (2013.01); *B60G 13/005* (2013.01); *B60G 2200/326* (2013.01); *B60G 2204/12* (2013.01); *B60G 2204/148* (2013.01); *B60G 2204/19* (2013.01); *B60G 2204/4306* (2013.01); *B60G 2206/72* (2013.01); *B60G 2206/8201* (2013.01); *B60G 2206/8207* (2013.01)

(58) Field of Classification Search
CPC .... B60G 9/02; B60G 13/005; B60G 2204/12; B60G 2206/8207; B60G 2206/8201; B60G 2204/4306; B60G 2204/148; B60G 2206/72; B60G 2204/19; B60G 2200/326; B60G 9/022
See application file for complete search history.

(56) References Cited

U.S. PATENT DOCUMENTS

| | | | |
|---|---|---|---|
| 5,328,159 A * | 7/1994 | Kaufman | B60G 11/113 267/52 |
| 5,476,251 A * | 12/1995 | Moses | B60G 9/003 180/905 |
| 6,224,074 B1 | 5/2001 | Cadden | |
| 6,264,231 B1 | 7/2001 | Scully | |
| 7,967,307 B2 | 6/2011 | Reineck | |
| 2004/0232646 A1 * | 11/2004 | Peters | B60G 5/02 280/124.132 |
| 2005/0253351 A1 * | 11/2005 | Pan | B60G 9/003 280/124.116 |
| 2008/0001379 A1 * | 1/2008 | Myers | B60B 35/007 280/124.156 |
| 2013/0300188 A1 * | 11/2013 | Dhont | B60G 21/051 301/124.1 |

* cited by examiner

Primary Examiner — Drew J Brown
(74) Attorney, Agent, or Firm — Brooks Kushman PC

(57) ABSTRACT

An axle assembly includes an axle housing having first and second arm portions that extend in opposite directions from a center portion, and an axle interface bracket that is fixedly mounted to the first arm portion. The axle interface bracket includes a base, holes extend from a bottom surface of the base, and channel walls that extend from the base and are disposed opposite the bottom surface.

20 Claims, 2 Drawing Sheets

AXLE ASSEMBLY AND METHOD OF MANUFACTURE

TECHNICAL FIELD

This disclosure relates to an axle assembly for a vehicle, and more particularly, to an axle assembly having an axle interface bracket and a suspension interface bracket.

BACKGROUND

An axle and suspension assembly is disclosed in U.S. Pat. No. 7,967,307.

SUMMARY

In at least one approach, an axle interface bracket is provided. The axle interface bracket may include a base having a bottom surface, a first set of holes, and a second set of holes. The first and second sets of holes may extend from the bottom surface. The axle interface bracket may further include first and second channel walls that extend from the base. The first and second channel walls may be disposed opposite the bottom surface. The first and second channel walls may cooperate with the base to define a channel for receiving an arm of an axle housing. The first channel wall may extend from the base between the first set of holes and the channel, and the second channel wall may extend from the base between the second set of holes and the channel.

In at least one approach, an axle assembly is provided. The axle assembly may include an axle housing having first and second arm portions that extend in opposite directions from a center portion. The axle assembly may further include an axle interface bracket that is fixedly mounted to the first arm portion. The axle interface bracket may include a base having a bottom surface, a first set of holes, and a second set of holes. The first and second sets of holes may extend from the bottom surface. The axle interface bracket may further include first and second channel walls that extend from the base. The first and second channel walls may be disposed opposite the bottom surface. The first and second channel walls may cooperate with the base to define a channel for receiving an arm of an axle housing. The first channel wall may extend from the base between the first set of holes and the channel, and the second channel wall may extend from the base between the second set of holes and the channel.

In at least one approach, a method of assembling an axle assembly is provided. The method may include providing an axle interface bracket that has a base having a bottom surface, first and second sets of holes that extend from the bottom surface, and first and second channel walls that extend from the base and are disposed opposite the bottom surface. The first and second channel walls may cooperate with the base to define a channel for receiving an arm of an axle housing. The method may further include positioning an arm portion of an axle housing in the channel. The method may further include welding the arm portion to the first and second channel walls.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
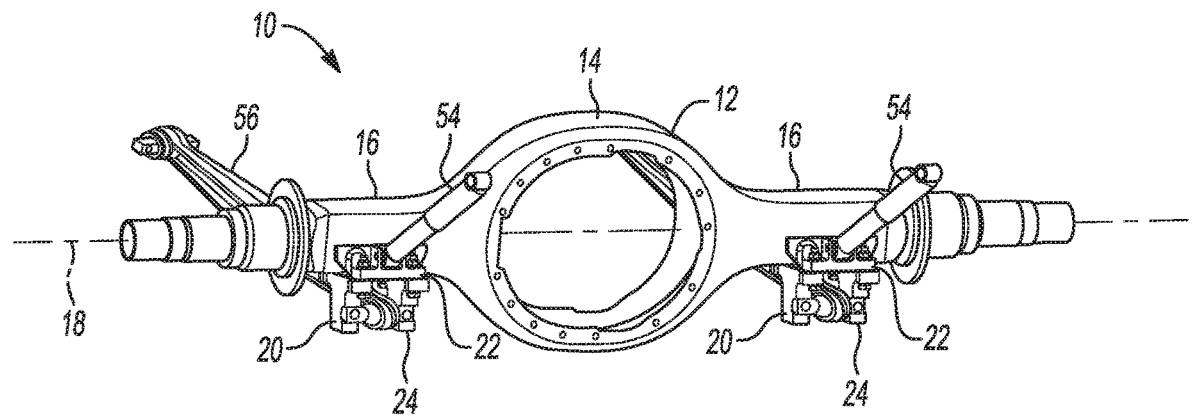
FIG. 1 is a perspective view of an axle assembly.

Referring to FIG. 1, an axle assembly 10 may be provided for a vehicle (not shown). An axle assembly 10 may be utilized in a tandem or other multiple axle arrangement in which each axle assembly 10 is supported on a frame by a four bar linkage so that each axle moves independently of one another.

The axle assembly 10 may be adapted to provide torque to associated wheel assemblies via wheel axle output shafts of the vehicle. In this way, the axle assembly 10 may be referred to as a drive axle assembly. In at least one approach, the vehicle is a bus or a coach vehicle. For example, the axle assembly 10 may be a rear-axle assembly of a bus. In still other approaches, the axle assembly 10 may be provided for an on-highway truck, an off-highway vehicle, a trailer, a military vehicle, a construction vehicle, a utility vehicle, a fire vehicle, or an emergency vehicle.

The axle assembly 10 may include an axle housing 12. The axle housing 12 may include a center portion 14 and at least one arm portion 16. The center portion 14 may be disposed proximate the center of the axle housing 12. The center portion 14 may receive various components of the axle assembly 10. For example, the center portion 14 may define a cavity that may receive a differential assembly. A lower region of the center portion 14 may at least partially define a sump portion that may contain lubricant. Splashed lubricant may flow down the sides of the center portion 14 and may flow over internal components of the axle assembly 10 and gather in the sump portion.

One or more arm portions 16 may extend from the center portion 14. For example, two arm portions 16 may extend in opposite directions from the center portion 14. The arm portions 16 may have substantially similar configurations. In at least one approach, the arm portions 16 may each have a hollow configuration such that the arm portions 16 define an arm cavity that may receive a corresponding axle shaft. In at least another approach, the arm portions 16 may not be hollow.

An arm portion 16 may define one or more substantially planar surfaces. For example, an arm portion 16 may define a substantially quadrilateral cross-section about a longitudinal axis 18 that may extend through the arm portion 16 of the axle housing 12. The substantially quadrilateral cross-section may include four substantially planar exterior wall surfaces. In still another approach, an arm portion 16 may define a substantially tubular cross-section about the longitudinal axis 18.

The axle assembly 10 may include an axle bracket assembly 20 adapted to connect the axle housing 12 to a suspension system (discussed in greater detail elsewhere herein).

Figure 2:
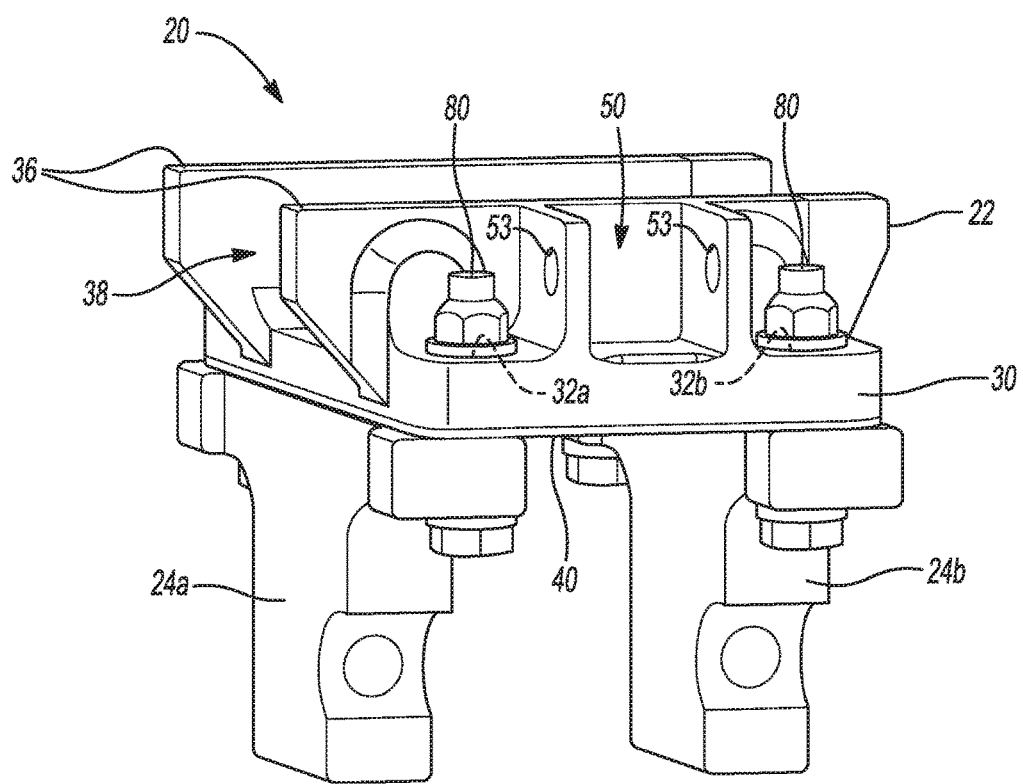
FIG. 2 is a perspective view of an axle bracket assembly.

Referring momentarily to FIG. 2, the axle bracket assembly 20 may be a multi-component bracket assembly that may include an axle interface bracket 22 and a suspension interface bracket 24. The axle interface bracket 22 may include a body defining a base 30. The base 30 may define a substantially quadrilateral base portion.

Figure 3:
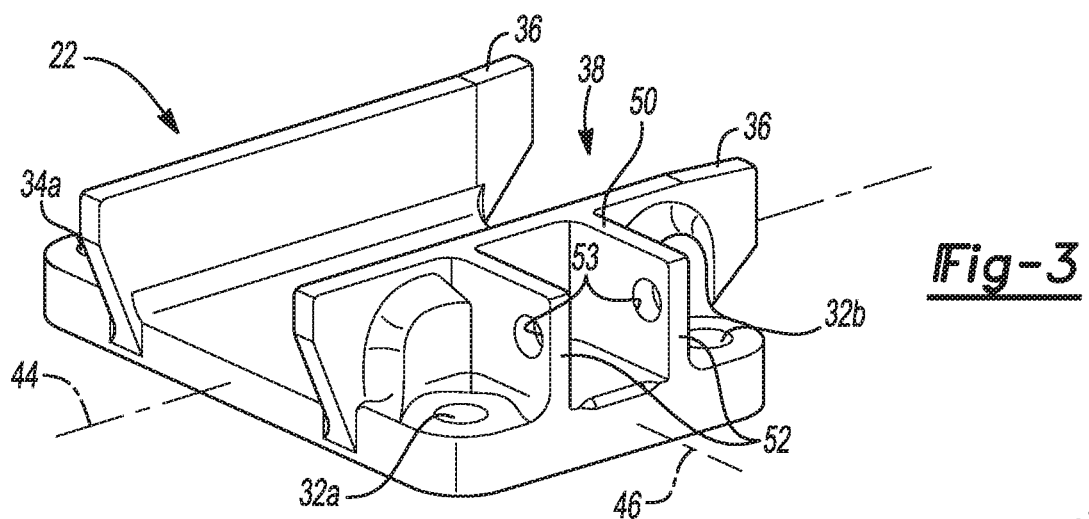
FIG. 3 is a perspective view of an axle interface bracket.

As shown in the approach of FIG. 3, the base 30 may have having a first set of holes 32a, 32b and a second set of holes 34a, 34b. For example, the first and second sets of holes may be disposed through axle flange regions of the axle interface bracket 22.

In at least one approach, members 32a, 32b of the first set of holes and the members 34a, 34b of the second set of holes may disposed along different non-intersecting axes. For example, the holes may be arranged such the holes are not coaxially disposed.

In at least one approach, the holes may be through-holes. As used herein, holes are through-holes if they extend through an entire thickness of the body through which they are disposed. In this way, the first and second sets of holes may extend from a top surface of the base 30 to a bottom surface of the base 30. As such, and as will be discussed in greater detail elsewhere herein, a fastener may be passed through an entire height of a through-hole. In still another approach, the holes may not be through-holes. As such, the holes may not pass through an entire thickness of the body through which they are disposed. Such holes may be, for example, internally threaded holes for receiving a threaded fastener.

The axle interface bracket 22 may further include channel walls 36. For example, the axle interface bracket 22 may include two channel walls 36. The channel walls 36 may extend from the base 30. In at least one approach, the channel walls 36 may be parallel channel walls. The channel walls 36 may extend longitudinally; for example, along axes parallel to the longitudinal axis 18. The channel walls 36 may be disposed between the first set of holes 32a, 32b and the second set of holes 34a, 34b. The channel walls 36 may define a channel 38 between the channel walls 36. The channel 38 may be suitably dimensioned to receive the axle housing 12; for example, at the arm portions 16. In at least one approach, a first channel wall 36 may extend from the base 30 between the first set of holes 32a, 32b and the channel 38, and a second channel wall 36 may extend from the base 30 between the second set of holes 34a, 34b and the channel 38.

The axle interface bracket 22 may be secured to the axle housing 12. In at least one approach, the axle interface bracket 22 may be welded to the axle housing 12 at an arm portion 16. For example, the axle interface bracket 22 may be welded to the axle housing 12 at the channel walls 36. More particularly, the axle interface bracket 22 may be welded to the axle housing 12 at peripheral edge regions of the channel walls 36. In this way, a first weld may connect a first channel wall 36 to an arm portion 16, and a second weld may connect a second channel wall 36 to the arm portion 16. In at least one approach, the suspension interface bracket 24 may be mounted to the axle interface bracket 22 prior to welding the arm portion 16 to the channel walls 36.

Figure 4:
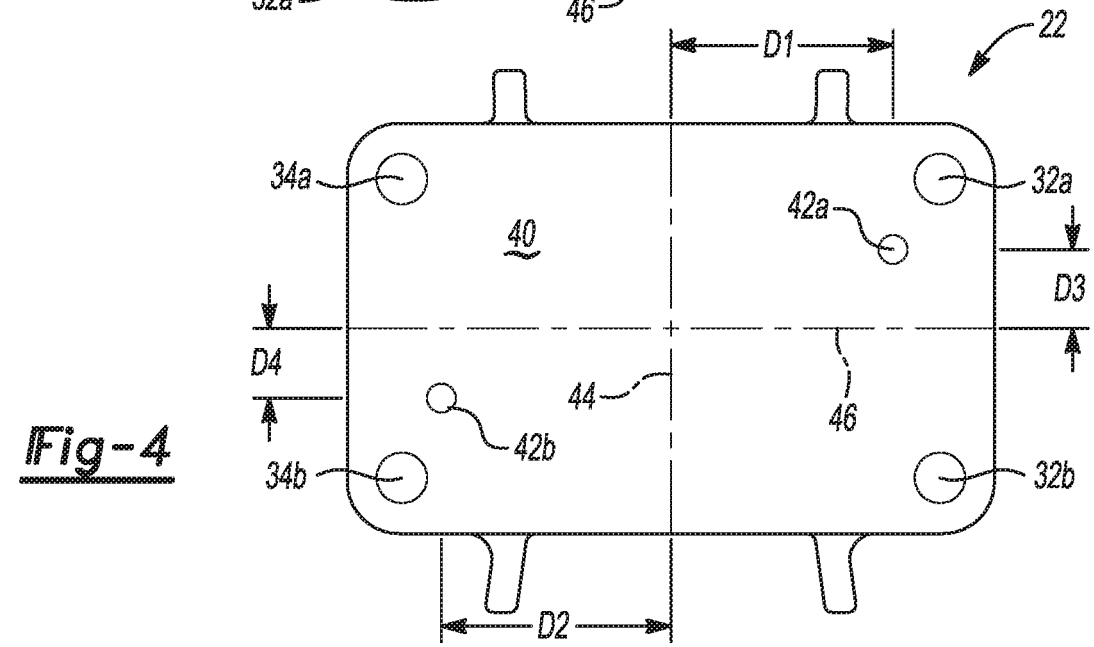
FIG. 4 is a bottom plan view of the axle interface bracket.

Referring to FIG. 4, the base 30 may define a mating surface. The mating surface may have, for example, a bottom surface 40 of the base 30. As used herein, "bottom" may refer to the orientation of the axle interface bracket 22 as shown in FIGS. 1-3. The bottom surface 40 may be a substantially planar surface. The bottom surface 40 may include the first set of holes 32a, 32b. In at least one approach, the bottom surface 40 may further include one or more dowel apertures 42a, 42b. For example, a first dowel aperture 42a may be arranged generally between through-hole 32a and through-hole 32b of the first set of holes, and a second dowel aperture 42b may be arranged generally between through-hole 34a and through-hole 34b of the second set of holes.

In at least one approach, the dowel apertures 42a, 42b may be arranged on a central longitudinal axis 44 extending equidistant between a central axis of a through-hole of the first set of holes (e.g., through-hole 32a) and a central axis of a through-hole of the second set of holes (e.g., through-hole 34a). As used herein, the longitudinal axis 44 may be an axis parallel to the longitudinal axis 18 of FIG. 1. In still another approach, the dowel apertures 42a, 42b may be offset from the central longitudinal axis 44 such that the central longitudinal axis 44 does not extend through the dowel apertures 42a, 42b. In still another approach, a first dowel aperture (e.g., dowel aperture 42a) may be arranged on the central longitudinal axis 44, and a second dowel aperture (e.g., dowel aperture 42b) may be offset from the central longitudinal axis 44.

In still another approach, the dowel apertures 42a, 42b may be offset different distances from the central longitudinal axis 44. For example, a first dowel aperture (e.g., dowel aperture 42a) may be offset a first distance D1 from the central longitudinal axis 44, and a second dowel aperture (e.g., dowel aperture 42b) may be offset a second distance D2 from the central longitudinal axis 44, such that the second distance D2 is different (e.g., greater) than the first distance D1.

In at least one approach, the dowel apertures 42a, 42b may be arranged on a central transverse axis 46 extending equidistant between central axes of the first and second individual holes 32a, 32b (and which may also be equidistant between central axes of holes 34a, 34b). As used herein, the transverse axis 46 may be an axis generally orthogonal to the longitudinal axis 18 of FIG. 1. In still another approach, the dowel apertures 42a, 42b may be offset from the transverse axis 46 such that the transverse axis 46 does not extend through the dowel apertures 42a, 42b. In still another approach, a first dowel aperture (e.g., dowel aperture 42a) may be arranged on the transverse axis 46, and a second dowel aperture (e.g., dowel aperture 42b) may be offset from the transverse axis 46.

In still another approach, the dowel apertures 42a, 42b may be offset different distances from the transverse axis 46. For example, a first dowel aperture (e.g., dowel aperture 42a) may be offset a first distance D3 from the transverse axis 46, and a second dowel aperture (e.g., dowel aperture 42b) may be offset a second distance D4 from the transverse axis 46, such that the second distance D4 is different (e.g., greater) than the first distance D3.

In still another approach, the dowel apertures 42a, 42b may have different diameters. For example, dowel aperture 42a may have a diameter that is greater or smaller than a diameter of dowel aperture 42b.

The offsets and variable dowel aperture diameters may assist a user in assembling an axle interface bracket 22 with a suspension interface bracket 24. More particularly, the offsets and variable dowel aperture diameters may assist a user in assembling the axle interface bracket 22 in a proper orientation relative to the suspension interface bracket 24.

The axle interface bracket 22 may include a damper bracket 50. The damper bracket 50 may include one or more damper mounting walls 52. For example, first and second damper mounting walls 52 may extend from a channel wall 36 in a direction that extends away from the channel 38. The first damper mounting wall 52 may be spaced apart from the second damper mounting wall 52. The damper bracket 50 may be located on the axle interface bracket 22 such that a first member (e.g., hole 32*a*) of the first set of holes is located opposite a first damper mounting wall 52 from the cavity, and such that a second member (e.g., hole 32*b*) of the first set of holes is located opposite a second damper mounting wall 52 from the cavity.

The damper mounting walls 52 may define one or more mounting holes 53 adapted to facilitate mounting of a portion of a suspension system. More particularly, the first and second damper mounting walls 52, along with at least one of a channel wall 36 and the base 30, may cooperate to at least partially define a cavity for receiving a portion of a damper 54. For example, as shown in FIG. 1, the damper bracket 50 may receive an end of a damper 54 within the cavity. The damper 54 may be pivotably connected to the axle interface bracket 22 at the damper bracket 50 such that the damper 54 is rotatable relative to the axle interface bracket 22. The damper 54 may be a shock absorber, a strut, or other suitable damper.

As discussed, the axle bracket assembly 20 may include a suspension interface bracket 24. The suspension interface bracket 24 may be a single-piece construction, or may be a multi-piece construction. For example, in at least one approach shown in FIGS. 1 and 2, the suspension interface bracket 24 may include multiple discrete suspension interface brackets 24*a*, 24*b*. The discrete suspension interface brackets 24*a*, 24*b* may be secured to the axle interface bracket 22 such that the discrete suspension interface brackets 24*a*, 24*b* are spaced apart and do not contact an adjacent suspension interface bracket 24*a*, 24*b*. The suspension interface brackets 24*a*, 24*b* may have the same configuration. In this way, the suspension interface brackets 24*a*, 24*b* may be installed in an interchangeable arrangement. The suspension interface brackets 24*a*, 24*b* may instead have different configurations.

The discrete suspension interface brackets 24*a*, 24*b* may be spaced apart such that a portion of a suspension system may be received therebetween. For example, the discrete suspension interface brackets 24*a*, 241 may receive an end of a walking beam 56, as shown in FIG. 1. The walking beam 56 may be pivotably connected to the discrete suspension interface brackets 24*a*. 24*b* such that the walking beam 56 is rotatable relative to the discrete suspension interface brackets 24*a*, 24*b*.

Figure 5:
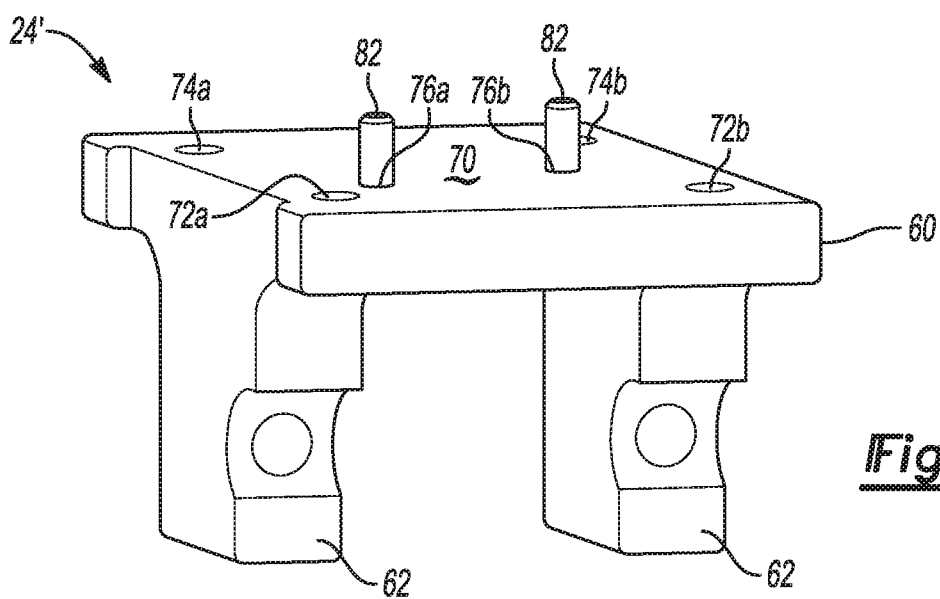
FIG. 5 is a perspective view of a suspension interface bracket.

In at least another approach, shown in FIG. 5, the suspension interface bracket may be a unitary suspension interface bracket 24'. The suspension interface bracket 24' may include a base region 60. The base region 60 may define a substantially quadrilateral base portion. One or more posts 62 may extend from the base region 60. The posts 62 may be spaced apart such that a portion of a suspension system, such as walking beam 56, may be received therebetween.

The suspension interface bracket 24, 24' may define a mating surface. The mating surface may have, for example, a top surface 70 of the base 30. As used herein, "top" may refer to the orientation of the suspension interface bracket 24 as shown in FIGS. 1, 2, and 5. The top surface 70 may be a substantially planar mating surface. The top surface 70 may include a third set of holes 72*a*, 72*b* and a fourth set of holes 74*a*, 74*b*. For example, the third and fourth sets of holes may be disposed through the top surface 70 at suspension flange regions of the suspension interface bracket 24.

In the assembled configuration, the top surface 70 may engage the bottom surface 40 of the axle interface bracket 22. Also in the assembled configuration, the third set of holes 72*a*, 72*b* may be substantially aligned (e.g., along central axes of the holes 72*a*, 72*b*) with the first set of holes 32*a*, 32*b*. Also in the assembled configuration, the fourth set of holes 74*a*, 74*b* may be substantially aligned (e.g., along central axes of the holes 74*a*, 74*b*) with the second set of holes 34*a*, 34*b*.

In at least one approach, the top surface 70 may further include one or more dowel apertures 76*a*, 76*b*. For example, a third dowel aperture 76*a* may be arranged generally between through-hole 72*a* and through-hole 72*b* of the third set of holes, and a second dowel aperture 76*b* may be arranged generally between through-hole 74*a* and through-hole 74*b* of the fourth set of holes. In at least one approach, the dowel apertures 76*a*, 76*b* may be disposed in alignment (or substantially alignment) with the dowel apertures 42*a*, 42*b* of the axle interface bracket 22.

The holes may be dimensioned to receive mechanical fasteners 80 therein. The mechanical fasteners 80 may be any mechanical fastener (or combination of mechanical fasteners) suitable to substantially inhibit movement of the suspension interface bracket 24 relative to the axle interface bracket 22. For example, the mechanical fasteners 80 may be threaded bolt and nut assemblies.

The dowel apertures may be dimensioned to receive dowels 82 therein. The dowels 82 may be received in opposing dowel apertures 42*a*, 76*a* and 42*b*, 76*b*. The dowels 82 may assist a user during assembly of the axle bracket assembly 20. The dowels 82 may also provide additional shear resistance. The dowels 82 may be used to provide additional shear resistance in locations in which mechanical fasteners 80 may not be desirable. For example, packaging concerns may limit the ability to locate mechanical fasteners within the damper bracket 50 of the axle interface bracket 22.

In at least one approach, the axle interface bracket 22 and the suspension interface bracket 24 may be different materials. For example, the axle interface bracket 22 may be formed of a first material, such as a casting or steel casting. The suspension interface bracket 24 may be formed of a second material, such as a cast or steel stamping. The different materials may have different material chemistries. The different material chemistries may be, for example, different carbon equivalent. In this way, dissimilar materials can be used for the axle interface bracket 22 and the suspension interface bracket 24. Dissimilar materials may be beneficial or necessary for various reasons, such as weld compatibility, strength and durability reasons, cost reasons, etc.

In at least one approach, a method of assembling an axle assembly is provided. The method may include providing an axle interface bracket that has a base having a bottom surface, first and second sets of holes that extend from the bottom surface, and first and second channel walls that extend from the base and are disposed opposite the bottom surface. The first and second channel walls may cooperate with the base to define a channel for receiving an arm of an axle housing. The method may further include positioning an arm portion of an axle housing in the channel. The method may further include welding the arm portion to the first and second channel walls.

The method may further include mounting a suspension interface bracket to the bottom surface of the axle interface bracket. In at least one approach, the method may further include mounting the suspension interface bracket to the axle interface bracket after welding the arm portion to the first and second channel walls. In at least another approach, the method may further include mounting the suspension interface bracket to the axle interface bracket prior to welding the arm portion to the first and second channel walls.

In at least one approach, a method of assembling a drive axle assembly is provided. The method may include welding an axle interface bracket to an axle housing. The interface bracket may be formed of a first material having a first carbon equivalent. The method may further include securing a suspension interface bracket to the axle interface bracket through at least a plurality of mechanical fasteners. The suspension interface bracket may be formed of a second material having a second carbon equivalent different than the first carbon equivalent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle interface bracket comprising:
   a base having a bottom surface, a first set of holes, and a second set of holes, wherein the first and second sets of holes extend from the bottom surface;
   first and second channel walls that extend from the base and are disposed opposite the bottom surface, wherein the first and second channel walls cooperate with the base to define a channel for receiving an arm of an axle housing, wherein the first channel wall extends from the base between the first set of holes and the channel and the second channel wall extends from the base between the second set of holes and the channel; and
   a first damper mounting wall that extends from the first channel wall in a direction that extends away from the channel, wherein the first damper mounting wall has a mounting hole adapted to facilitate mounting of a damper.

2. The axle interface bracket of claim 1 wherein the bottom surface is substantially planar.

3. The axle interface bracket of claim 1 wherein a dowel aperture is provided in the bottom surface.

4. The axle interface bracket of claim 1 further comprising a second damper mounting wall that extends from the first channel wall in the direction that extends away from the channel, wherein the second damper mounting wall has a mounting hole adapted to facilitate mounting of the damper.

5. The axle interface bracket of claim 4 wherein the first damper mounting all is spaced apart from the second damper mounting wall.

6. The axle interface bracket of claim 4 wherein the first damper mounting wall, the second damper mounting wall, and the first channel wall cooperate to at least partially define a cavity for receiving a portion of the damper.

7. The axle interface bracket of claim 6 wherein a first member of the first set of holes is located opposite the first damper mounting wall from the cavity, and wherein a second member of the first set of holes is located opposite the second damper mounting wall from the cavity.

8. The axle interface bracket of claim 1 wherein members of the first set of holes and members of the second set of holes are disposed along different non-intersecting axes.

9. An axle assembly comprising:
   an axle housing having first and second arm portions that extend in opposite directions from a center portion;
   an axle interface bracket that is fixedly mounted to the first arm portion, the axle interface bracket including:
      a base having a bottom surface, a first set of holes, and a second set of holes, wherein the first and second sets of holes extend from the bottom surface, and
      first and second channel walls that extend from the base and are disposed opposite the bottom surface, wherein the first and second channel walls cooperate with the base to define a channel that receives the first arm portion, wherein the first channel wall extends from the base between the first set of holes and the channel and the second channel wall extends from the base between the second set of holes and the channel, wherein the channel receives the first arm portion; and
   a suspension interface bracket that is mounted to the bottom surface of the axle interface bracket.

10. The axle assembly of claim 9 further comprising a first weld that connects the first channel wall to the first arm portion and a second weld that connects the second channel wall to the first arm portion.

11. The axle assembly of claim 9 wherein the axle interface bracket includes a first damper mounting wall that extends from the first channel wall in a direction that extends away from the channel, wherein the first damper mounting wall has a mounting hole adapted to facilitate mounting of a damper.

12. The axle assembly of claim 9 wherein the axle interface bracket is formed of a first material having a first material chemistry, and wherein the suspension interface bracket is formed of a second material different than the first material and having a second material chemistry that is different than the first material chemistry.

13. The axle assembly of claim 9 wherein the suspension interface bracket has a set of suspension interface bracket holes, wherein each member of the set of suspension interface bracket holes is aligned with a member of the first set of holes or a member of the second set of holes.

14. The axle assembly of claim 13 wherein a fastener extends through each member of the first set of holes and through a corresponding member of the set of suspension interface bracket holes and couples the suspension interface bracket to the axle interface bracket.

15. The axle assembly of claim 13 wherein a fastener extends through each member of the second set of holes and through a corresponding member of the set of suspension interface bracket holes and couples the suspension interface bracket to the axle interface bracket.

16. The axle assembly of claim 9 wherein the suspension interface bracket has a top surface that engages the bottom surface of the axle interface bracket, and a set of suspension interface bracket holes that extends from the top surface.

17. The axle assembly of claim 9 wherein the axle interface bracket further includes first and second damper mounting walls that extend from the first channel wall in a direction that extends away from the channel, wherein the first and second damper mounting walls cooperate to at least partially define a cavity that receives a portion of a damper and the damper is attached to the first and second damper mounting walls.

18. A method of assembling an axle assembly, the method comprising:
   providing an axle interface bracket that has a base having a bottom surface, first and second sets of holes that extend from the bottom surface, and first and second channel walls that extend from the base and are disposed opposite the bottom surface, wherein the first and second channel walls cooperate with the base to define a channel for receiving an arm of an axle housing;

positioning an arm portion of an axle housing in the channel;

welding the arm portion to the first and second channel walls; and mounting a suspension interface bracket to the bottom surface of the axle interface bracket.

19. The method of claim 18 wherein the suspension interface bracket is mounted to the bottom surface of the axle interface bracket before welding the arm portion to the first and second channel walls.

20. The method of claim 18 wherein the suspension interface bracket is mounted to the axle interface bracket after welding the arm portion to the first and second channel walls.

\* \* \* \* \*